May 20, 1958 H. E. SIVERSON Re. 24,475

CHAIN CONSTRUCTION

Original Filed May 24, 1954 2 Sheets-Sheet 1

INVENTOR.
HARRY E. SIVERSON
BY F. H. Geisler.
ATTORNEY

CHAIN CONSTRUCTION

Original Filed May 24, 1954 2 Sheets-Sheet 2

INVENTOR.
HARRY E. SIVERSON
BY
F. R. Geiler
ATTORNEY

United States Patent Office

Re. 24,475
Reissued May 20, 1958

24,475

CHAIN CONSTRUCTION

Harry E. Siverson, Portland, Oreg.

Original No. 2,798,381, dated July 9, 1957, Serial No. 431,682, May 24, 1954. Application for reissue December 9, 1957, Serial No. 701,691

1 Claim. (Cl. 74—252)

Matter enclosed in heavy brackets [ ] appears in the original patent but forms no part of this reissue specification; matter printed in italics indicates the additions made by reissue.

This invention relates in general to chains and chain construction wherein it is necessary to make provision for the replacing of individual links in the chain.

More particularly, the present invention relates to saw chains, as used in power-driven saws, in which some of the links of the chain constitute the working teeth of the saw.

Since one or more individual teeth or tooth links in a saw chain of a power-driven saw occasionally become broken or otherwise unfit for further efficient service, while the remaining saw chain teeth are still in such good condition that the discarding of the entire saw chain would not be justified, it is necessary from time to time to replace individual tooth links in the saw chain.

A chief object of the present invention is to provide an improved chain construction in which the replacing of individual links or saw tooth links can be accomplished with a minimum amount of time, labor and expense.

It is customary in various chain constructions, including saw chain construction, to connect successive links together by means of transversely-extending pins or rivets which then provide the pivotal connection of the links embodied in the chain. In saw chains heretofore it has been considered necessary to have these pins or rivets formed of hardened steel or other suitably durable metal in order to enable them to withstand the frictional wear produced by the pivoting of the links under the working tension of the chain. When an individual link or tooth of the saw chain is replaced, the pins or rivets by which such link or tooth is connected to the adjacent links in the chain must be removed. This ordinarily necessitates the destruction of the pins or rivets. The employment of such pins or rivets of such hardened metal in chains in which individual links may need replacing, as in saw chains, accordingly has two disadvantages. It makes the pins or rivets more expensive than would be the case if they were made of softer and cheaper metal, and the operation of removing the pins or rivets of hardened metal involves more labor and thus more expense than when the pins or rivets are made of softer metal.

Accordingly, a specific object of the present invention is to provide an improved chain construction in which inexpensive pins of cheap metal can be used for holding the links together as satisfactorily, permanently and efficiently as pins of harder and more expensive metal.

In some chain constructions removable bushings are placed around the pins or rivets in order to reduce the wear on the pins or rivets. However, this involves additional expense in chain construction. A further object of the present invention is to eliminate the necessity of providing separate bushings for such pins or rivets in the chain.

In the following description of the improved chain construction which has attained these objects and incidental advantages, reference is to be made to the following drawings wherein.

Figure 1:
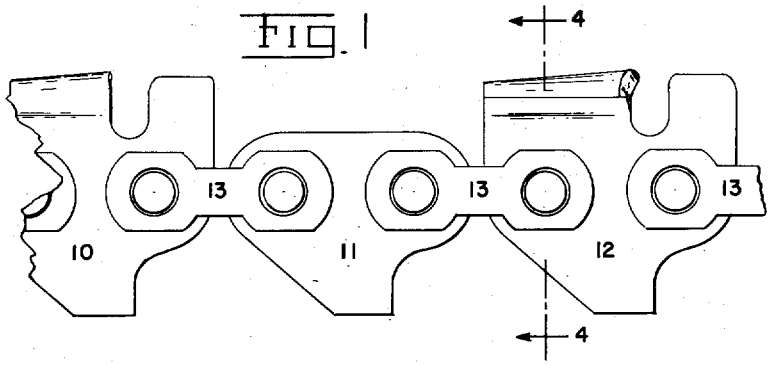
Figure 1 is a fragmentary side elevation of one form of saw chain embodying the invention.
Figure 2:
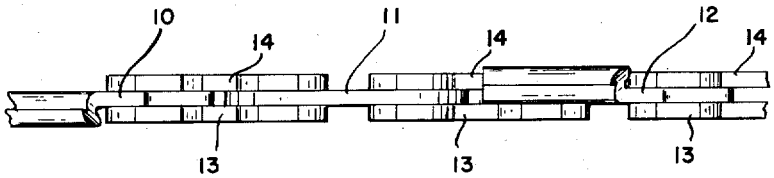
Figure 2 is a fragmentary top plan view of the saw chain of Figure 1.
Figure 3A:
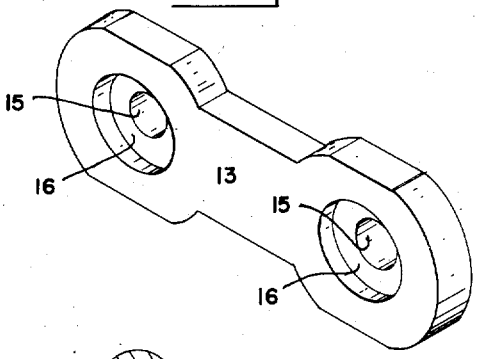
Figure 3A is a perspective view of one of the members of a pair of side links by which the tooth links and center links are connected.
Figure 3B:
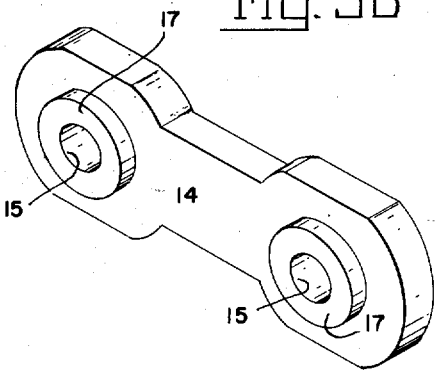
Figure 3B is a perspective view of the other member of the pair of connecting side links.

Referring first to Figures 1 and 2, the portion of the particular saw chain illustrated includes three longitudinally spaced center links 10, 11 and 12. Each of these links is connected to the next center link by a pair of oppositely disposed side links 13 and 14. The side links 13 and 14 are all identical (see also Figures 3A and 3B). In the saw chain of Figures 1 and 2 the center links 10 and 12 constitute cutting tooth links and the center link 11 is a spacer link between these cutting tooth links. The particular formation of the cutting tooth links 10 and 12 and their arrangement with respect to an interposed center space link 11 are the same as described in my co-pending application, Serial No. 404,477, filed under date of January 18, 1954, and entitled "Saw Chain Tooth," now Patent 2,713,276. This particular saw chain is shown merely for the purpose of illustration inasmuch as the form, shape and arrangement of the center links do not constitute any part of the present invention, the present invention being concerned with the connecting joints between the pairs of side links 13 and 14 and the succesisve center links of the chain.

Each of the side links 13 and 14 (Figures 3A and 3B) is provided with the customary aperture 15 near each end to receive the pin or similar element which extends through each pair of respective registering apertures of such pair of side links and which pins hold the links of each pair together and in place on the chain. However, in the carrying out of my invention each of these side links 13 and 14 is formed with a recess 16 on the outside face of the link surrounding the aperture 15 and it also is formed with an annular shoulder 17 on the opposite or inside face of the link surrounding each such aperture. The peripheral walls of the shoulders 17 are concentric with the apertures 15, and preferably, though not necesarily, the recesses 16 are circular and have approximately the same diameter as the peripheral walls of the shoulders 17 and are co-axial therewith.

Figure 5:
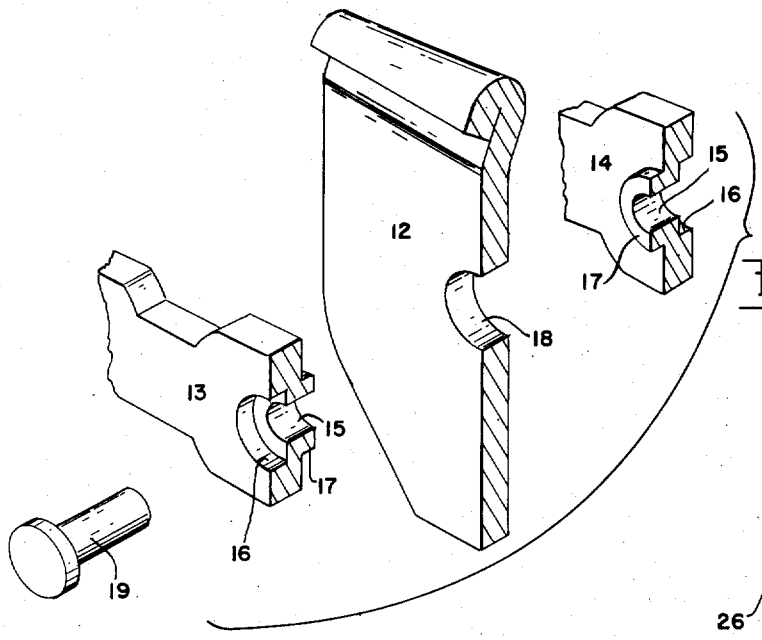
Figure 5 is an exploded view showing the various members of Figure 4 in perspective and arranged in their relative positions with respect to each other.

Each of the center links 10, 11 and 12 has an aperture near each end, as is customary, but with my invention each of these center link apertures 18 (Figure 5) is made slightly larger in diameter than the diameter of the peripheral walls of the shoulders 17. Thus, a transversely-aligned pair of shoulders 17 from a pair of side links 13, 14 will be received in each aperture 18 of each center link when the chain is set up. Consequently, the periperal walls of the shoulders 17 serve as bearing surfaces at the pivot joints between the center links and their connecting pairs of side links.

A pin or rivet 19 extends through each pair of aligned apertures 15 in the pairs of oppositely disposed side links 13 and 14 (see Figure 4) with the enlarged ends of the pins or rivets positioned within the recesses 16 in the outside faces of the side links. In this construction the pins or rivets 19 serve merely to hold the oppositely disposed side links of each pair in position together and serve to prevent the shoulders 17 from sliding out of the apertures 18 of the center links in which the shoulders are inserted. The pins or rivets 19 do not serve as bearing surfaces nor do they perform any function other than holding the side links in each pair together.

Figure 4:
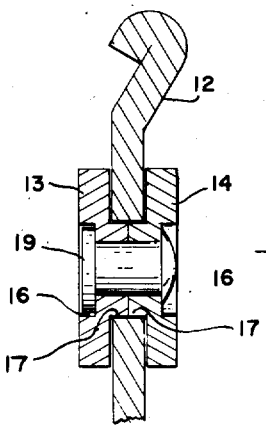
Figure 4 is a transverse section taken on line 4—4 of Figure 1, but drawn to a larger scale.

Preferably the height of each annular shoulder 17, that is to say, the distance which it extends beyond the inside face of the side link, is slightly greater than one half the thickness of the center links. This allows freedom of pivotal movement of the center links with respect to the pairs of side links with which they are connected, even though the pins or rivets 19 hold the opposed aligned shoulders 17 pressed tightly against each other as illustrated in Figure 4.

Since the pins or rivets 19 in my improved chain construction do not serve as bearing surfaces, and since very little strain is imposed upon these pins or rivets, they may preferably be made of cheaper, un-hardened metal, which would not be possible if the pins or rivets had to provide the bearing surfaces for the center links as heretofore customary. Also my invention dispenses entirely with the use of shoulder type rivets, which are employed in some chain constructions, and which are more expensive to make than straight rivets. When replacement of a tooth link becomes necessary in a saw chain embodying my present invention, this requires the temporary disconnecting of side links at such point in the chain. This, in turn, involves the removal of the pins or rivets from such side links. The fact that, with my invention these pins or rivets are straight rivets and are formed from un-hardened metal makes their punching out or removal much easier, and also, since these pins or rivets will be cheaper when made of un-hardened metal, the destruction of the pins or rivets in the course of their removal does not involve any appreciable cost.

Figure 7:
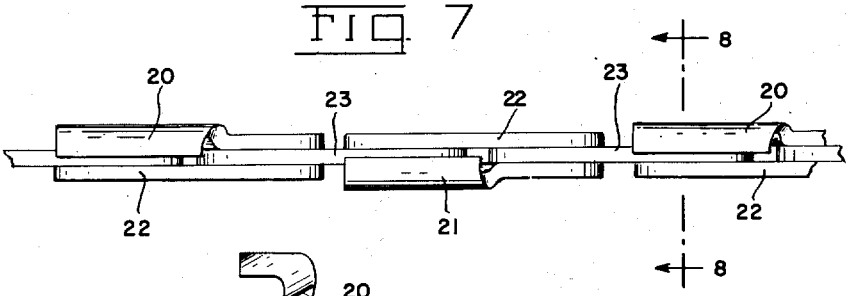
Figure 7 is a fragmentary top plan view of another form of saw chain having a cutting tooth link on one side.
Figure 8:
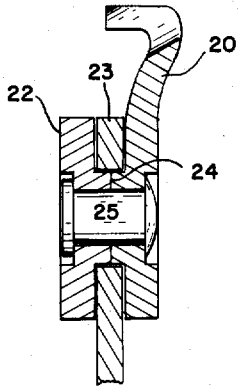
Figure 8 is a transverse section on line 8—8 of Figure 7, drawn to a larger scale.

It is possible to employ my invention in saw chains in which some or all of the tooth links constitute side links instead of center links. In Figures 7 and 8 I show a saw chain construction in which the cutting teeth 20 and 21 constitute side links on alternate sides of the chain. A companion side link 22 forms the other member of each pair of side links, and these pairs of side links are joined with the successive center links 23. In this saw chain of Figures 7 and 8 the pairs of side links 20 and 22 and 21 and 22 are all formed with annular shoulders 24 (Figure 8) on their inside faces around the apertures for the pins or rivets 25, and the abutting pairs of shoulders 24 provide the bearing surfaces for the center links 23 in the same manner as previously described.

Figure 6:
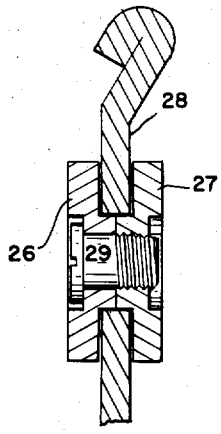
Figure 6 is a transverse section similar to Figure 4 but showing a modified chain pin which may be used specifically in the carrying out of the present invention.

Instead of the familiar pins or rivets at the link joints in my improved chain construction, it is possible also to employ screw pins very satisfactorily, as illustrated in Figure 6. In this modified construction the pair of side links 26, 27 to which a center link 28 is connected, are similar to the side links 13, 14 previously described except that each aperture in at least one side link of each pair, for example in the link 27 as illustrated, is formed with a threaded wall to engage the threads of a screw pin 29, the head of the screw pin 29 being received in the recess of the opposite side link. While such screw pins are more expensive than ordinary rivet pins they are even more easily removed for replacement of links and in addition may be reused after removal since their removal does not involve their destruction as in the case of ordinary rivets.

Obviously my invention may be employed with other chains than those which I have illustrated and may include other minor modifications, as long as the side links are formed with shoulders which provide the bearing surfaces for the center links, instead of having such bearing surfaces in the chain joints provided by pins or similar members, either alone or with separate protecting bushings.

I claim:

[1. In a saw chain, a pair of longitudinally spaced center links of the same thickness, a pair of oppositely disposed side links joining said center links together, an aperture in each of said side links near each end, said apertures being identical in size and the respective apertures of said side links being in transverse axial alignment, said side links being deformed so as to provide an inwardly offset annular shoulder on the inside face surrounding and concentric with each aperture with a corresponding recessed portion on the outside face concentric with the aperture, said shoulder having an outer cylindrical wall, the axial length of said shoulder and the depth of said corresponding recessed portion being not more than half the thickness of the side link, said shoulder and said recessed portion being approximately the same diameter, each center link having an aperture near each end with a diameter only slightly greater than the diameter of said cylindrical shoulder walls, said center links and said side links arranged in said chain with one pair of corresponding shoulders from said side links positioned in an aperture of one center link and the other pair of corresponding shoulders from said side links positioned in an aperture of the other of said center links, said cylindrical walls of said shoulders constituting the sole bearing surfaces for the circumferential walls of the respective apertures of said center links in the pivotal motion between said center links and said side links, the relative thickness of said center links and said side links being such that the axial length of each of said shoulders will be slightly greater than one half the thickness of said center links, and a member in each pair of aligned apertures of said side links holding said side links together with the corresponding shoulders pressed against each other, the ends of said members not extending beyond the outside faces of said side links.]

*2. In a saw chain, a pair of longitudinally spaced center links of the same thickness, a pair of oppositely disposed side links joining said center links together, an aperture in each of said side links near each end, said apertures being identical in size and the respective apertures of said side links being in transverse axial alignment, said side links being deformed so as to provide an inwardly offset annular shoulder on the inside face surrounding and concentric with each aperture with a corresponding recessed portion on the outside face concentric with the aperture, said shoulder having an outer cylindrical wall, the axial length of said shoulder and the depth of said corresponding recessed portion being not more than half the thickness of the side link, said shoulder and said recessed portion being approximately the same diameter, each center link having an aperture near each end with a diameter only slightly greater than the diameter of said cylindrical shoulder walls, said center links and said side links arranged in said chain with one pair of corresponding shoulders from said side links positioned in an aperture of one center link and the other pair of corresponding shoulders from said side links positioned in an aperture of the other of said center links, said cylindrical walls of said shoulders constituting the sole bearing surfaces for the circumferential walls of the respective apertures of said center links in the pivotal motion between said center links and said side links, the relative thickness of said center links and said side links being such that the axial length of each of said shoulders will be slightly greater than one half the thickness of said center links, and a rivet in each pair of aligned apertures of said side links holding said side links together with the corresponding shoulders pressed against each other,*

*the headed ends of said rivets being seated within said recessed portions of said side links.*

References Cited in the file of this patent or the original patent

UNITED STATES PATENTS

| | | |
|---|---|---|
| 1,023,549 | Buettner et al. | Apr. 16, 1912 |
| 1,146,905 | Stark | July 20, 1915 |
| 1,468,866 | Morgan | Sept. 25, 1923 |
| 2,356,437 | Smith | Aug. 22, 1944 |
| 2,469,524 | Simmons | May 10, 1949 |
| 2,722,843 | Edwards | Nov. 8, 1955 |

FOREIGN PATENTS

| | | |
|---|---|---|
| 439 | Great Britain | 1889 |
| 97,792 | Germany | July 6, 1898 |